Aug. 24, 1954    D. W. FISHER    2,687,285
PORTABLE BATCHER PLANT
Filed July 19, 1952    3 Sheets-Sheet 1
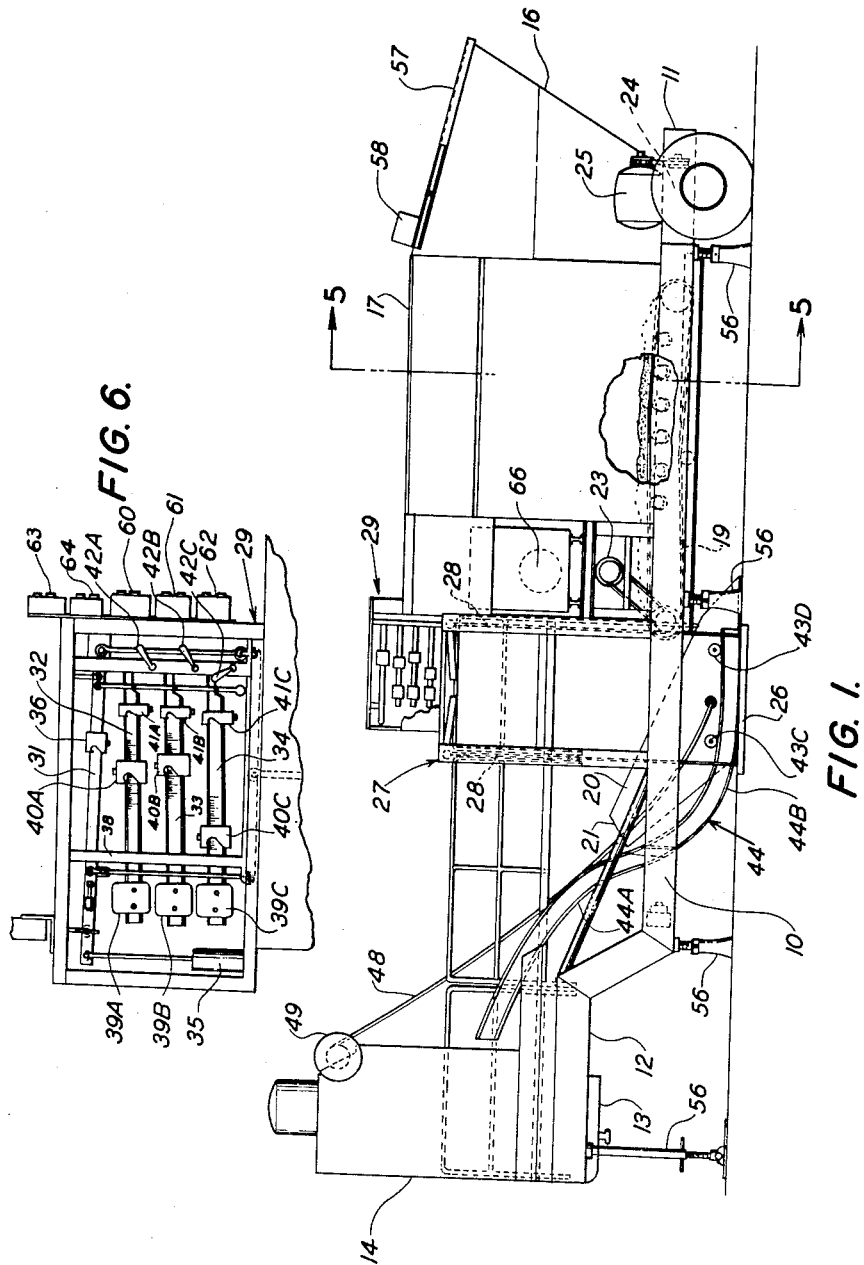
INVENTOR.
DELMAR W. FISHER
BY
James B Christie
ATTORNEY Aug. 24, 1954   D. W. FISHER   2,687,285
PORTABLE BATCHER PLANT
Filed July 19, 1952   3 Sheets-Sheet 2
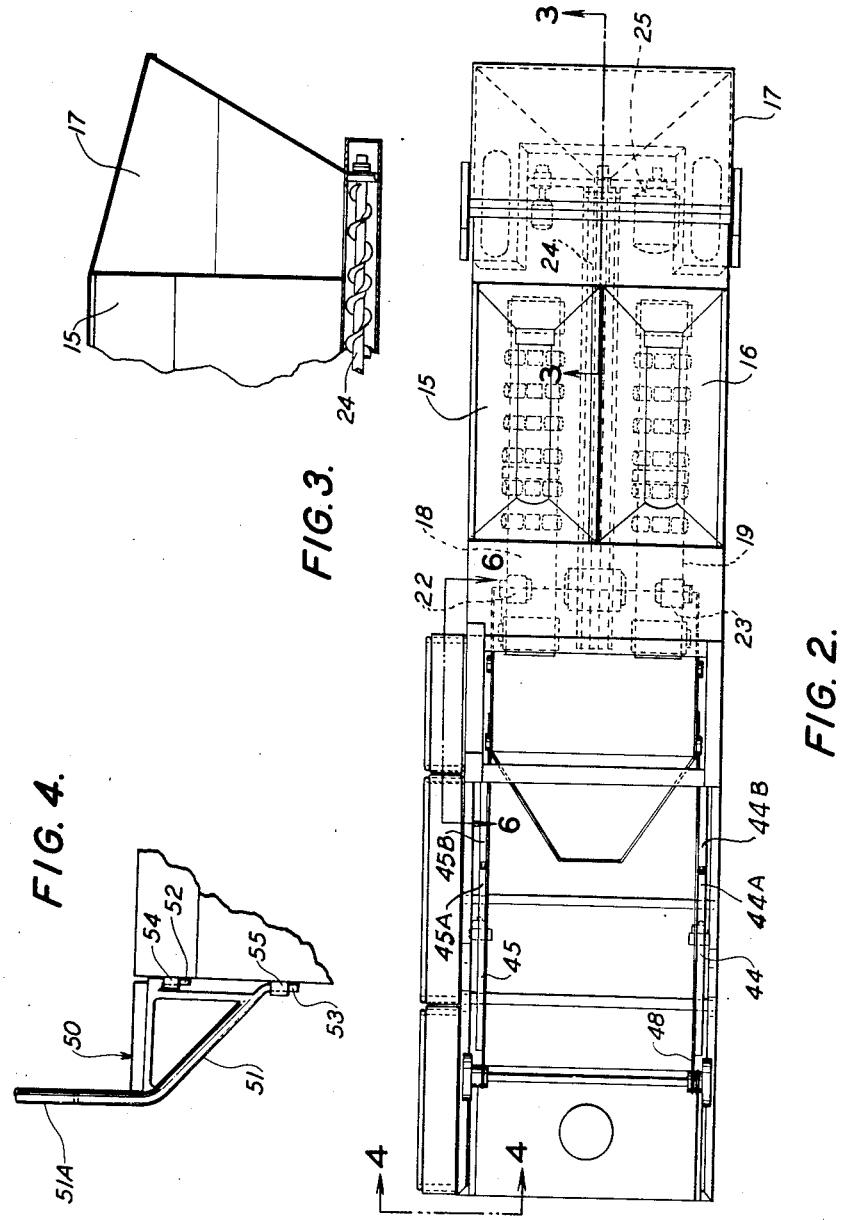
INVENTOR.
DELMAR W. FISHER
BY
James B Christie
ATTORNEY Aug. 24, 1954     D. W. FISHER     2,687,285
PORTABLE BATCHER PLANT Filed July 19, 1952     3 Sheets-Sheet 3

INVENTOR.
DELMAR W. FISHER
BY James B Christie
ATTORNEY

Patented Aug. 24, 1954

2,687,285

UNITED STATES PATENT OFFICE 2,687,285

PORTABLE BATCHER PLANT

Delmar W. Fisher, Phoenix, Ariz.

Application July 19, 1952, Serial No. 299,882

12 Claims. (Cl. 259—154)

This invention is concerned with the preparation of concrete from its ingredients and provides improved portable batchers for proportioning the ingredients and mixing them into concrete at the job site.

Concrete is prepared by mixing water with cement and aggregate, usually sand and gravel, in predetermined proportions. These proportions have been determined to give optimum properties for various types of concrete, and it is important that these proportions be maintained. By way of example, the concrete specifications of the United States Bureau of Public Roads must be followed rigidly in most major highway construction. To do so, it has become customary to employ a central stationary batcher plant and portable truck-mounted mixers. The ingredients are measured into the mixers at the plant and mixed enroute to the job, where the resulting concrete is ready for discharge into the forms. This "ready-mix" scheme, although it produces an excellent quality of concrete, is limited in application. There is a haulage radius beyond which it becomes uneconomical, and in areas of sparse population and little industrial activity the investment in a stationary batcher plant is not justified. In such cases, the mixer is usually located at the job site and fed by wheelbarrows or the like. This requires excessive labor and introduces the human factor so that more care must be exercised to assure proper concrete quality. There is a need for a rugged, compact, accurate and portable batcher plant which can be moved from job to job. The instant invention fulfills this need.

In accordance with my invention I provide a batcher plant mounted on a vehicle, preferably a semi-trailer. The plant consists of a plurality of bins, say three, for the dry ingredients, cement, sand and gravel. These bins preferably are mounted on the rear of the trailer with their bottoms low and with the mixer on the fore-part, preferably above the trailer hitch and in an elevated position. A scale of the platform type is mounted on the trailer, and preferably the movable platform is located below the bottoms of the bins and between the bins and the mixer. A movable hopper or skip, preferaly track-mounted, is adapted to rest on the platform while it is being loaded, and power-actuated means, such as a which, is provided for moving the loaded hopper to the inlet of the mixer and discharging into it a batch of correctly proportioned dry ingredients. Individual power-actuated feeding or conveying means extend from the respective bin outlets to the hopper resting on the scale platform and controls are provided so that an operator can control each feeding means and stop and start them at will. If desired, these controls can be made automatic, so that the feeders operate in sequence with one stopping and the next starting when the correct weight of an ingredient has been fed in by the first.

In the preferred form of the apparatus of my invention, three bins are disposed on the rear of the trailer. The two side bins hold sand and gravel respectively, which are fed forward by motor-driven dished belt conveyors overhanging the platform of the scales, and dump into the hopper when it is in loading position. Dry cement is kept in the center bin and fed forward by a motor-driven closed screw conveyor which likewise overhangs the scale platform and discharges into the hopper when it is in loading position.

The preferred batcher has a multiple beam scale, with one beam for the tare, and one for each dry ingredient, making a total of four. Each beam is set to respond to the correct weight of the ingredient it represents. The ingredients are fed serially into the hopper and each beam lifts as the proper weight is attained. As the beam lifts the flow of the ingredient it represents is stopped and that of the next one started, either by an operator or automatically.

When the correct proportion of dry ingredients of a batch have been dumped into the hopper, it is pulled up on a track, which is roughly S-shaped in side view, by a winch and dumped into the mixer. Then the hopper returns by gravity to the loading position on the scale platform. The track is so shaped that the hopper rolls in and out from under the discharge ends of the conveyors which overhang the scale platform. Thus in being drawn up to the mixer, it moves approximately horizontally until it clears the ends of the conveyors.

The track is made in two interlocking sections. The upper section is supported on the trailer frame; the lower section is supported on the platform and moves up and down with it, forming a part of the scale tare.

A measured batch of water is added to the dry ingredients in the mixer, which is of conventional type, and after mixing the wet concrete is discharged forward into waiting receptacles, such as the conventional wet concrete trucks used in highway construction.

These and other features of my invention are illustrated by the accompanying drawings in which:

Fig. 1 is a side view, partly in section, of a presently preferred form of my batcher plant;

Fig. 2 is a top view of the apparatus of Fig. 1;

Fig. 3 is a fragmentary side section, taken along the line 3—3 of the apparatus of Fig. 1, illustrating the connection of the closed screw conveyor with the cement bin;

Fig. 4 is a fragmentary view taken along the line 4—4 of Fig. 2 and illustrates the manner in which a detachable operating platform is fastened to the side of the apparatus;

Fig. 6 is a fragmentary side view of the apparatus of Fig. 1, showing details of construction of the multiple-beam scale.

Figures 5, 7:
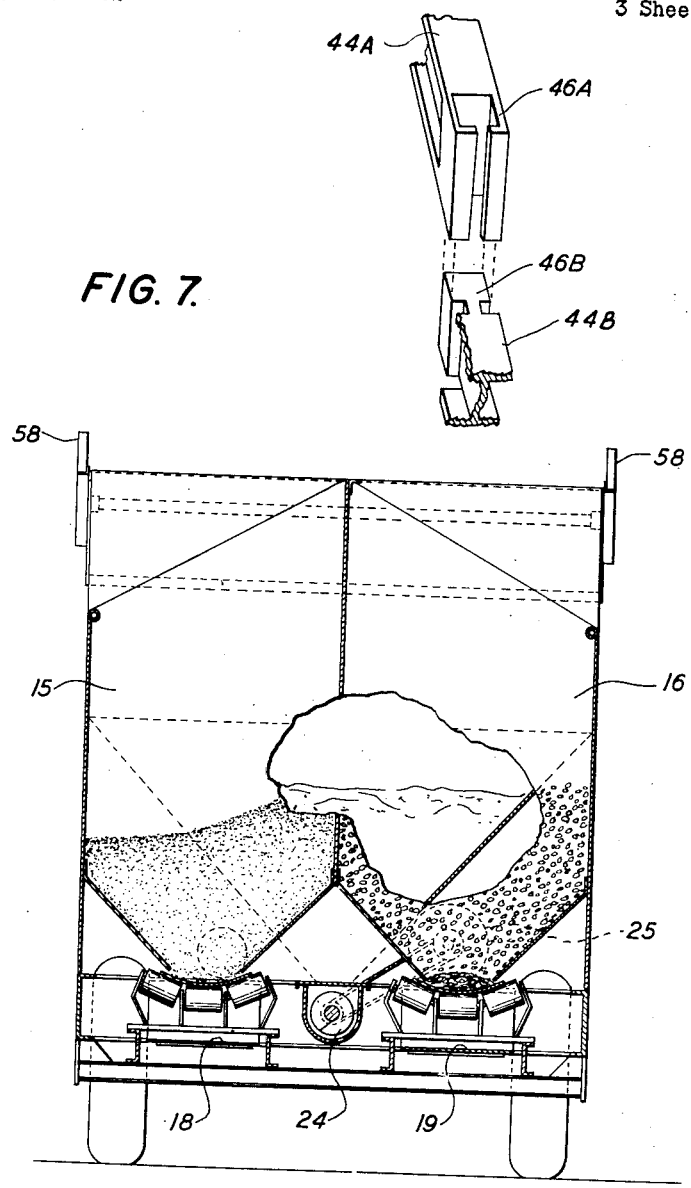
Fig. 5 is a vertical section taken along the line 5—5 of Fig. 2.
Fig. 7 is a fragmentary perspective view showing how the lower and upper ends of the hopper track are interlocked but still free to move vertically with respect to each other.

The illustrated equipment comprises a semi-trailer chassis 10 mounted on two pneumatic tired wheels. The rear portion 11 of the trailer is low but the forward portion 12 carries a conventional semi-trailer hitch bearing plate 13 for mounting on a conventional tractor hitch (not shown). The forward portion of the chassis also serves as an elevated support for a conventional concrete mixer 14 which is shown schematically.

Three bins 15, 16, 17 are mounted on the rear of the trailer. The ones 15, 16 on the sides are for sand and gravel respectively. The other bin 17, mounted centrally to the rear of the first two, is for bulk cement. All three bins have hopper bottoms. The outside ones for sand and gravel terminate in dished belt conveyors 18, 19 which extend forward horizontally and discharge into a movable shovel-like charge skip or hopper 20. The wide portion of the charge hopper is toward the rear and the front portion is a funnel 21, through which the dry charge is dumped into the mixer. The two belt conveyors are belt-driven by individual electric motors 22, 23 mounted above the conveyors. The dry cement is discharged from the bottom of its bin into a closed screw conveyor 24 which extends forward between the two belt conveyors and likewise discharges into the charge hopper, which it overhangs when the hopper is in loading position. The screw conveyor is driven from the rear by an electric motor 25 mounted above it toward one side.

The platform 26 of a multi-beam scale 27 is disposed horizontally between the mixer and the bins at a low level. It is supported by rods 28 from the beam mechanism 29 of the scale, which is shown in detail in Fig. 6.

The beam mechanism is of conventional multiple type. There are four scale beams 31, 32, 33, 34. The uppermost 31 is the tare beam. It is provided with a counterweight 35 and an adjustable weight 36 so that the scale may be balanced when the empty hopper is rested on the scales. The other three scale beams are identical and are disposed on knife edges on an upwardly extending fulcrum holder 38. Each has a counterweight 39A, 39B, 39C, a fine adjustment weight 40A, 40B, 40C and a principal weight 41A, 41B, 41C. By means of latches or hold levers 42A, 42B, 42C any or all of the weighing beams may be connected into the leverage system.

The uppermost 32 of the three identical scale beams is the "gravel" beam and its weights are so set that it comes into balance when the correct amount of gravel is on the scales. The beam 32 is connected by means such as a connector (not shown) with a switch 60 which controls the motor of the gravel conveyor. As the beam comes into balance the contactor breaks the circuit in the switch and stops the flow of gravel. When this occurs, the operator manually unlatches the next beam 33 which weighs the sand and starts the sand conveyor by pushing a switch 61 connected to the motor of that conveyor. When the beam 33 comes into balance its contactor (not shown) interrupts the current through the switch 61 to the motor of the sand conveyor and stops the flow of sand. Then the operator unlatches the bottom or "cement" beam 34 and pushes the switch 62 which starts the cement conveyor by supplying current to its motor. Current continues to flow until a contactor (not shown) mechanically connected to the "cement" beam breaks the circuit to the motor of the cement conveyor, which occurs when the "cement" beam comes to balance.

Additional switches, such as a switch 63 connected to the winch circuit and a switch 64 for controlling the mixer, are mounted adjacent the others near the scale latches.

The hopper has four flanged wheels 43A, 43B, 43C, 43D, two on each side. These run on parallel rails 44, 45. Each rail is roughly S-shaped as viewed from the side and consists of an upper section 44A, 45A and a lower section 44B, 45B. The lower sections are fastened to and rest on the scale platform, forming a part of it. The upper sections are fastened to the truck chassis and are not supported on the scale platform. Each upper section is connected to its corresponding lower section by an interlocking joint. Each upper section carries a female joint member 46A; each lower section carries a male joint member 46B, which is prevented from moving laterally or backward and forward by the female joint member but can slide up and down in the member as the scale platform moves (see Fig. 7).

The lower sections of the track are horizontal on the platform but curve upwardly at their forward ends to a straight slanted portion where the interlocking joints are located. Above the joints the upper track sections are curved in the opposite direction and become flatter at their ends adjacent the mixer.

A cable 48 from an electrically powered winch 49 is connected to the hopper. The winch is mounted adjacent the mixer at a high elevation and as the cable is wound on the winch drum it pulls the hopper up the track until its forward or funnel-shaped end abuts the rear of the mixer. Further winding of the drum causes the rear wheels of the hopper to leave the track while the front wheels act as a fulcrum and cause the rear of the hopper to tip up and discharge its contents through the funnel-shaped front end into the mixer.

The mixer itself is of the conventional motor-driven type and discharges its contents forward over the front end of the trailer into a waiting vehicle (not shown) as each batch is completed.

The apparatus illustrated is of standard highway dimensions, the sole projection from the sides being a detachable operating platform 50, shown in detail in Fig. 4. This platform has a plurality of brackets 51, which support the platform proper with a safety railing 51A on the outside. The top and bottom of each bracket is provided with pins 52, 53 which drop into socket members 54, 55 welded to the side of the apparatus.

The apparatus is pulled to the job by a conventional truck tractor unit, not shown. There the apparatus is supported by a plurality of screw jacks 56 which are placed under the chassis. Next the tractor is unhitched. If desired, the same truck tractor may be employed to move a water-tank mounted on a semi-trailer (not shown) to the job.

Once in position, the bins are loaded by a conventional skip loader mounted on a rubber-tired farm tractor, the design being such that the tops of the bins can be reached with such a loading device. The sand and gravel bins are open at the top, but the cement bin is provided with a tight cover 57 which is hinged to its top and provided with a counterweight 58 to facilitate raising it. The hinge is water-proof.

The apparatus illustrated is readily placed in condition for highway travel. The charge hopper is raised onto the upper portion of the track and fastened at that point. The scale platform is raised slightly and locked in position. The operating platform is detached and a truck tractor for towing is backed into position and hitched to the tractor. Then the screw jacks are removed. Unloaded, the unit illustrated weighs about eight tons and can be towed safely at normal highway speeds by a standard one and one-half ton truck tractor. No brakes are required on the batcher itself, but such brakes can be added at nominal cost.

At the job site, the jacks are placed in position; the truck tractor is unhitched; the operating platform is attached; the scale platform is unlatched, and the charge hopper released so that it is free to ride up and down on the track. The bins are then charged by a conventional skip loader mounted on a rubber tired farm tractor. The skip loader dumps each of the dry ingredients into its storage bin ready to use in the batch cycle. Water for the concrete mixture is supplied from a tank on a separate semi-trailer (not shown), which is towed by the same truck tractor used for moving the batcher from job to job.

A conventional measuring tank (not shown) is mounted atop the mixer unit and water from the tank truck is pumped into the measuring tank by an electrically driven pump (not shown) mounted on the batcher.

When the hopper is on the scale platform in loading position, the winch cable is slacked so that it will not interfere with proper weighing. The belt conveyors for sand and gravel and the screw conveyor for cement are operated in sequence. An operator on the operating platform adjusts the tare beam with the hopper empty so that the scale is in balance. He then adjusts the three dry ingredient beams to the proper weights, say in the ratio one cement, two sand, four gravel. He next releases the hold lever on the "gravel" beam of the scales and pushes the starter button for the electrical motor of the gravel conveyor. This starter button, like all the others for the individual motors, is placed adjacent the multiple beam assembly within convenient reach. The gravel conveyor proceeds to dump gravel into the hopper until the "gravel" beam comes into balance. The current to the motor on the gravel conveyor is then cut automatically by the associated mercury switch mounted in a conventional "up and down" indicator on the scales. The operator next releases the hold lever on the "sand" beam and pushes the starter button for the electric motor which drives the sand conveyor. The sand conveyor feeds sand into the hopper until the "sand" beam comes into balance, when it throws the second mercury switch and stops the sand conveyor. Then the operator releases the third hold lever for the "cement" beam and pushes the starter button for the motor which drives the screw conveyor. The screw then feeds the cement in until the "cement" beam comes into balance and stops the cement conveyor by means of the third mercury switch. The operator then presses the starter button for the winch, which pulls the hopper up and dumps it into the mixer. The measuring tank has been filled in the meantime by the pump and is permitted to drain into the mixer, which is turning. As soon as the wet charge has been mixed sufficiently it is dumped over the front of the batcher into a waiting vehicle, say a truck.

Most modern concrete specifications call for entraining air in the water supplied to the mixer. To this end, the apparatus may be provided with an electrical pump (not shown) for forcing air entrainment solution through an orifice (not shown) into the water for a predetermined and adjustable length of time. Conveniently this time is determined automatically by a conventional electrical time clock (not shown) such as is used in a great many other industrial operations. The operator merely pushes a starter button to start the flow of the entrainment solution and the pump is automatically stopped by the time clock.

The entire operation of loading and running the batcher plant can be conducted by two men, one charging the bins with the skip loader and the other on the operating platform carrying out the operations just described. These two men accomplish as much as eight men loading a mixer by conventional "wheelbarrow" methods.

The use of the batcher of the invention permits bulk cement to be employed instead of the conventional bag cement usually used when concrete is mixed on the job. This represents a substantial saving in the cost of bags alone.

In the operation of the apparatus the ingredients are measured accurately and the likelihood of human error is much reduced. If desired, the conveyor operation can be made almost totally automatic, by providing a mechanism which unlatches a weighing beam and starts the next conveyor when the preceding weighing beam comes into balance. By way of example, a solenoid may be energized when the "gravel" beam comes into balance and strikes an electrical contact completing a circuit through the solenoid. The energized solenoid releases the hold lever on the sand beam and at the same time pushes the switch controlling the motor of the sand conveyor. Similar means are provided on the "sand" beam to release the "cement" beam and start the cement conveyor when the "sand" beam comes into balance. With such an arrangement the operator merely pushes the starter button for the "gravel" conveyor at the beginning of the cycle, after which the three dry ingredients are fed automatically in sequence until the last dry ingredient has been added, when the operation is automatically interrupted.

The preferred form of my batcher plant is completely electrified, the several electrical motors being designed to operate at the same voltage, say 220. Power may be supplied from a portable generator 66 (see Fig. 1) or from a regular power line if this is available at the site.

The cement may be prevented from hanging up in the bin by a conventional aerator device or a vibrator, neither of which is shown.

I claim:

1. In a portable batcher plant for apportioning ingredients for concrete and mixing them and including a vehicle, the combination which comprises a plurality of ingredient bins mounted on the vehicle, a mixer mounted on the vehicle, a scales having a vertically movable weighing platform suspended on the vehicle, a movable hopper adapted to rest on the platform, a track extending from the platform to the mixer and made in two sections, one supported on the platform and movable therewith and the other on the vehicle, means for moving the hopper from the platform to the mixer along the track, individual feeders for discharging the respective ingredients from the respective bins into the hopper on the platform and means for controlling each feeder.

2. Apparatus according to claim 1 in which the mixer is mounted laterally of and higher than the platform, and with the track extending upward from the platform to the mixer, the lower track section mounted on the platform being approximately level over the platform.

3. Apparatus according to claim 1 in which the mixer is mounted laterally of and higher than the platform and the track is curved upwardly from the platform to the mixer, the portion of the track over the platform being approximately level and the means for moving the hopper from the platform to the mixer being a winch mounted near the mixer and having a cable attached to the hopper.

4. Apparatus according to claim 1 in which the mixer is mounted laterally of the platform opposite the feeders, with the feeders projecting over the platform and in which the track over the platform is relatively level so that the hopper can ride in under the feeders.

5. In a portable batcher plant for apportioning ingredients for concrete and mixing them and including a vehicle, the combination which comprises a plurality of ingredient bins mounted near one end on the vehicle, a mixer mounted near the opposite end on the vehicle and having an inlet, a scales having a movable weighing platform suspended on the vehicle between the mixer and the bins, the mixer inlet being higher than the scale platform, a movable hopper adapted to rest on the platform, a track having an upper section supported on the vehicle and an interlocking lower section supported on the movable platform and movable up and down with it, a winch for moving the hopper from the platform to the mixer along the track, individual feeders for discharging the respective ingredients from the respective bins into the hopper on the platform and means for controlling each feeder.

6. In a portable batcher plant for apportioning ingredients for concrete and mixing them and including a vehicle, the combination which comprises a plurality of ingredient bins mounted near one end on the vehicle, a mixer mounted on the opposite end on the vehicle and having an inlet facing the bins, a scales having a vertically movable weighing platform suspended on the vehicle between the mixer and the bins, a track having an upper section supported on the vehicle and a lower section supported on the scale platform and movable up and down therewith, a movable hopper adapted to ride on the track and rest on the platform, means for moving the hopper from the platform to the mixer along the track and discharging the contents of the hopper into the mixer inlet, the mixer inlet being higher than the scale platform, individual feeders for discharging the respective ingredients from the respective bins into the hopper on the platform and means for controlling each feeder, and means for connecting a prime mover to the vehicle under the mixer.

7. In a portable batcher plant for apportioning ingredients for concrete and mixing them and including a vehicle, the combination which comprises a plurality of ingredient bins mounted near one end on the vehicle, a mixer mounted near the opposite end on the vehicle, a scale having a vertically movable weighing platform suspended between the mixer and the bins on the vehicle, a movable hopper adapted to rest on the platform and movable with it, the mixer being higher than the platform, a winch for moving the hopper from the platform to the mixer, a track on which the hopper rides to and fro between the platform and the mixer, the lower portion of the track being mounted on the platform and movable with it, and the upper section of the track being rigidly mounted on the vehicle, individual feeders disposed above the platform for discharging the respective ingredients from the respective bins into the hopper on the platform, and individual means for controlling each feeder.

8. Apparatus according to claim 7 in which the track is relatively level over the platform but curves upward toward the mixer.

9. In a portable batcher plant for apportioning ingredients for concrete and mixing them and including a vehicle, the combination which comprises three bins respectively for sand, gravel and cement mounted on the vehicle, a mixer mounted on the vehicle, a scale having a vertically movable weighing platform suspended on the vehicle between the bins and the mixer, a movable hopper adapted to rest on the platform, a track having two sections one fastener rigidly to the vehicle and the other resting on the platform and movable with it, means for moving the hopper from the platform to the mixer along the track, individual belt feeders for discharging sand and gravel respectively from respective bins into the hopper on the platform, a screw feeder for discharging cement from its bin into the hopper on the platform, and individual means for controlling each feeder.

10. In a portable batcher plant for apportioning ingredients for concrete and mixing them and including a vehicle, the combination which comprises a plurality of ingredient bins mounted on the vehicle, a mixer mounted on the vehicle, a scales having a vertically movable weighing platform suspended on the vehicle between the mixer and the bins, the scales being of the multiple beam type and having a tare beam to be balanced against the weight of the platform carrying the empty hopper, and a plurality of weighing beams corresponding in number to the number of dry ingredients and adapted to be balanced respectively against the respective desired weights of the dry ingredients to be mixed, a movable hopper adapted to rest on the platform and movable with it, a track composed of an upper section fastened to the vehicle and a lower section mounted on the platform and movable with it, means for moving the hopper from the platform to the mixer along the track, individual feeders for discharging the respective ingredients from the respective bins onto the hopper on the platform and individual means for controlling each feeder.

11. Apparatus according to claim 10 provided with latches on the respective weighing beams to lock the beams.

12. Apparatus according to claim 10 provided with latches on the respective weighing beams for locking the beams, with the control means for the several feeders located near the latches.

References Cited in the file of this patent

UNITED STATES PATENTS

| Number | Name | Date |
|---|---|---|
| 2,046,693 | McCrery | July 7, 1936 |
| 2,285,765 | Carswell | June 9, 1942 |
| 2,493,898 | Pollitz | Jan. 10, 1950 |
| 2,547,403 | Madsen | Apr. 3, 1951 |